(12) United States Patent
Jung et al.

(10) Patent No.: US 8,450,901 B2
(45) Date of Patent: May 28, 2013

(54) MOTOR FOR COMPRESSOR AND HERMETIC COMPRESSOR HAVING THE SAME

(75) Inventors: Hae-Ok Jung, Gyeongsangnam-Do (KR); Seong-Hun Seo, Gyeongsangnam-Do (KR); Jae-Hun Lee, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 296 days.

(21) Appl. No.: 12/743,936

(22) PCT Filed: Oct. 20, 2008

(86) PCT No.: PCT/KR2008/006203
§ 371 (c)(1),
(2), (4) Date: Sep. 8, 2010

(87) PCT Pub. No.: WO2009/066875
PCT Pub. Date: May 28, 2009

(65) Prior Publication Data
US 2010/0329907 A1   Dec. 30, 2010

(30) Foreign Application Priority Data

Nov. 22, 2007 (KR) .................. 10-2007-0119901
Nov. 22, 2007 (KR) .................. 10-2007-0119903

(51) Int. Cl.
*H02K 1/06* (2006.01)

(52) U.S. Cl.
USPC ..................................... 310/216.012; 310/71

(58) Field of Classification Search
USPC ................. 310/216.012, 216.011, 71, 42, 45, 310/208
See application file for complete search history.

(56) References Cited

U.S. PATENT DOCUMENTS

| | | | |
|---|---|---|---|
| 3,209,992 A | 10/1965 | Christiansen | |
| 3,942,055 A * | 3/1976 | Hoffmeyer | ............. 310/216.111 |
| 4,241,274 A | 12/1980 | Brammerlo | |
| 6,544,009 B2 | 4/2003 | Makino et al. | |
| 6,882,080 B2 | 4/2005 | Tanaka et al. | |
| 6,930,424 B2 | 8/2005 | Even et al. | |

(Continued)

FOREIGN PATENT DOCUMENTS

| | | |
|---|---|---|
| JP | 06-038422 | 2/1994 |
| JP | 2004-173366 | 6/2004 |
| JP | 2005-264749 | 9/2005 |
| KR | 10-0698218 | 3/2007 |

OTHER PUBLICATIONS

International Search Report and Written Opinion dated Sep. 14, 2010 (Application No. PCT/KR2008/006203).
Chinese Office Action dated May 8, 2012. (200880120572.6).

(Continued)

*Primary Examiner* — Thanh Lam
(74) *Attorney, Agent, or Firm* — KED & Associates LLP (57) ABSTRACT

A motor for a compressor and a hermetic compressor having the same are provided. An aluminum coil is used in the motor for the compressor, and sectional areas of main and sub slot portions and numbers thereof are adjusted to be suitable for usage conditions, whereby fabricating costs of the motor for the compressor and the hermetic compressor may drastically be reduced. Also, as the aluminum coil of the motor for the compressor is coupled to a lead wire in a welding manner, breaking of the aluminum coil, which may occur when coupling the aluminum coil to the lead wire, may be prevented, resulting in improvement of assembly reliability of the reciprocating compressor.

15 Claims, 4 Drawing Sheets

U.S. PATENT DOCUMENTS

| | | | |
|---|---|---|---|
| 7,081,697 B2 | 7/2006 | Neet | |
| 7,868,509 B2 * | 1/2011 | Yoshino et al. | 310/216.055 |
| 8,222,788 B2 * | 7/2012 | Rose | 310/195 |
| 2004/0119363 A1 | 6/2004 | Tanaka et al. | |
| 2007/0210668 A1 * | 9/2007 | Yoshino et al. | 310/216 |
| 2008/0012438 A1 * | 1/2008 | Hong | 310/71 |
| 2008/0129132 A1 * | 6/2008 | Gwon | 310/71 |
| 2008/0170952 A1 * | 7/2008 | Jung | 417/423.7 |
| 2009/0214363 A1 * | 8/2009 | Noh et al. | 417/423.7 |
| 2010/0117477 A1 | 5/2010 | Yoshino et al. | |
| 2010/0135830 A1 | 6/2010 | Yasuda et al. | |
| 2010/0247347 A1 | 9/2010 | Yoshino et al. | |
| 2010/0295390 A1 | 11/2010 | Rau et al. | |
| 2010/0329906 A1 | 12/2010 | Jung et al. | |
| 2010/0329907 A1 | 12/2010 | Jung et al. | |
| 2011/0050024 A1 | 3/2011 | Rose | |
| 2011/0081263 A1 | 4/2011 | Yoshino et al. | |

OTHER PUBLICATIONS

International Search Report and Written Opinion dated Sep. 13, 2010. (Application No. PCT/KR2008/006201).
International Search Report and Written Opinion dated Sep. 14, 2010 (Application No. PCT/KR 2008/006202).
U.S. Office Action issued in U.S. Appl. No. 12/743,906 dated Nov. 7, 2012.
U.S. Notice of Allowance issued in U.S. Appl. No. 12/743,917 dated Nov. 13, 2012.
U.S. Appl. No. 12/743,906, filed May 20, 2010.
U.S. Appl. No. 12/743,917, filed May 20, 2010.
Chinese Office action dated Jan. 23, 2013. (with translation).
"Emergency Stop Operation of a Small hydro-generator"; Zhao Qing'an et at; He'nan Science and Technology, vol. 10; Oct. 31, 2004.

* cited by examiner

MOTOR FOR COMPRESSOR AND HERMETIC COMPRESSOR HAVING THE SAME

TECHNICAL FIELD

The present invention relates to a motor for a compressor and a hermetic compressor having the same.

BACKGROUND ART

In general, a refrigerator or an air conditioner, as small-sized home alliances, is provided with a compressor for compressing a refrigerant. A representative motor for the compressor which drives the compressor is a well-known induction motor. The induction motor includes a stator on which a coil is wound, a rotor having conductors in the form of a squirrel cage and rotatably inserted inside of the stator, and a rotational shaft press-fitted in the center of the rotor for carrying a rotational force, generated by an interaction between a rotation magnetic field generated by an alternating current (AC) flowing in the coil of the stator and an induction current generated by the rotor, to a compression unit of the compressor.

Each of the stator and rotor is configured such that plural sheets of thin stator core are stacked together to be welded. The stator core of the stator includes a yoke portion formed in an approximately annular shape and implementing a moving path of magnetism, a plurality of tooth portions protruded from an inner circumferential surface of the yoke portion with a certain gap and having the coil wound therearound, and a slot portion recessed between the tooth portions so as to allow the coil wound around the tooth portions to be inserted therein.

The coil is widely implemented using copper (Cu) having high conductivity. The conductivity indicates how well a current flows in a material. However, it cannot be said that high conductivity always means many number of electrons flowing. The number of electrons is in proportion to a current. Accordingly, if conductivity is low but the current is the same, it can be said that the number of electrons are the same. However, with respect to the same current, the higher conductivity can decrease heat loss occurred in the material itself. A well-known material having the highest conductivity is argentums (Ag), but such Ag is expensive. Thus, copper requiring a relatively low price and having high conductivity is used for the motor for the compressor.

However, in the related motor for the compressor, in order to connect an extern power source to the coils of the stator, the coil of the stator and lead wire are connected to each other using a clamping terminal (hereinafter, referred to as 'clamp'). When the coils of the stator are connected using the clamp, if the coils of the stator have low tensile force, the coils are easily broken upon tightening the clamp, causing a defect. In particular, in case of using an aluminum coil (tensile force: 11.4 kgf·cm) as the stator coil, the aluminum coil has a tensile force corresponding to half of that of a copper coil (tensile force: 24.2 kgf·cm). Accordingly, upon using the clamp, such defect due to the broken coil may frequently occur.

DISCLOSURE

Technical Solution

In order to solve the problem of broken coils due to the connection between a coil of the related art motor for the compressor and the lead wire by using the clamp, the present invention provides a motor for a compressor capable of minimizing a breaking of the coil when connecting the stator coil and a lead wire to each other using a clamp, and a hermetic compressor having the same.

To achieve the aspect of the present invention, there is provided a motor for a compressor including: a stator provided with a yoke portion formed in an annular shape to configure a passage through which magnetism flows, a plurality of tooth portions protruded from an inner circumferential surface of the yoke portion toward a center thereof by a certain length in a circumferential direction, and a plurality of slot portions recessed between the tooth portions as deep as configuring a certain sectional area in a circumferential direction; coils wound on the slot portions and the tooth portions of the stator, at least some of the coils being formed of aluminum; a rotor inserted in the stator with a certain gap and having conductors therein which is rotated by an electromagnetic induction of the coils; a rotational shaft press-fitted in the center of the rotor for transferring a is rotational force to a compression unit; and a terminal having lead wires connected to the coils in a welding manner for connecting the coils to external power sources.

In one aspect of the present invention, there is provided a hermetic compressor including: a hermetic case; a driving motor installed in the hermetic case for generating a rotational force; and a compression unit installed in the hermetic case and driven by the driving motor for compressing a refrigerant, wherein a stator of the driving motor is wound by an aluminum coil and the coil is connected to the lead wire in a welding manner.

In a motor for a compressor and a hermetic compressor having the same according to the present invention, the use of an aluminum coil allows a drastic reduction of fabricating costs for the motor for the compressor and the hermetic compressor having the same. Also, as the aluminum coil of the motor for the compressor is connected to a lead wire in a welding manner, a breaking of the aluminum coil which may occur while the coil of the motor for the compressor is connected to the lead wire can previously be prevented, thereby increasing reliability of the motor for the compressor and the hermetic compressor having the same.

MODE FOR INVENTION

Hereinafter, detailed description will be given of a motor for a compressor and a hermetic compressor having the same with reference to the accompanying drawings according to the present invention.

Figure 1:
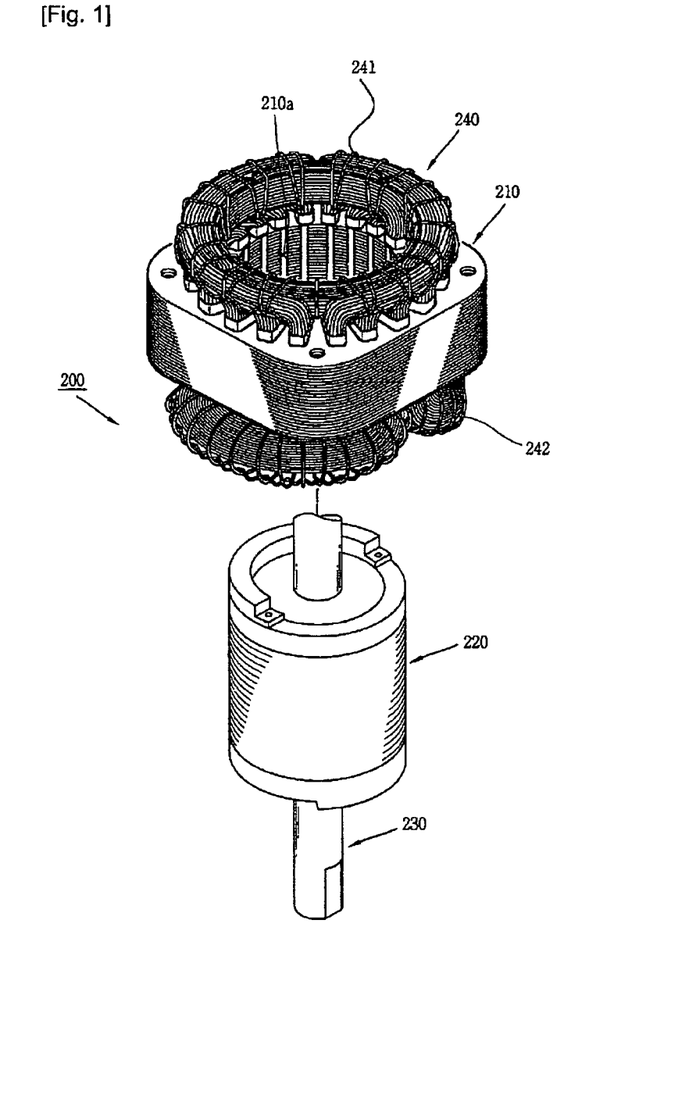
FIG. 1 is a perspective view showing a disassembled motor for a compressor according to the present invention.
Figure 2:
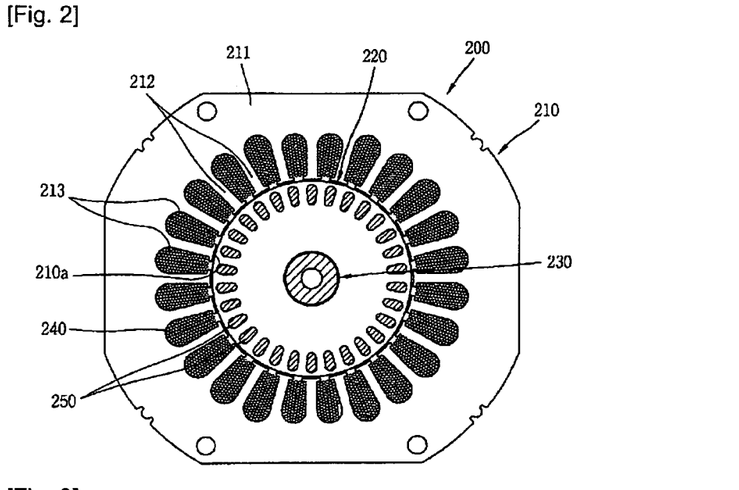
FIG. 2 is a planar view of the motor for the compressor shown in FIG. 1.

As shown in FIGS. 1 and 2, a motor 200 for a compressor according to the present invention may include a stator 210 fixed to a hermetic case of the compressor and having a coil 240 wound thereon, a rotor 220 rotatably inserted inside the stator 210 and having conductors 250 therein, and a rotational shaft 230 press-fitted in the center of the rotor 220 for transferring a rotational force to a compression unit of the compressor.

The stator 210 is formed by axially laminating plural sheets of stator core up to a certain height and welding them together. The plural sheets of stator core form a rotor insertion hole 210a having an outer circumferential surface with an approximately tetragonal shape (or it may be similar to a circular shape) and an inner circumferential surface with an approximately circular shape.

The stator core forms a yoke portion 211 configuring a moving path of magnetism with being connected in an approximately circumferential direction at its periphery. The yoke portion 211 may be integrally formed. Alternatively, the yoke portion 211 may be formed in a form of circular arc, depending on a sheet metal working for the stator core, so as to be coupled each other in a bulgy and hollow combination or be welded together. The yoke portion 211 has great influence on efficiency of the motor 200. The entire available area of the yoke portion 211 may appropriately be determined according to a decision with respect to an inner diameter of the stator 210 and an entire area of a slot portion 213 as will be explained later.

Figure 3:
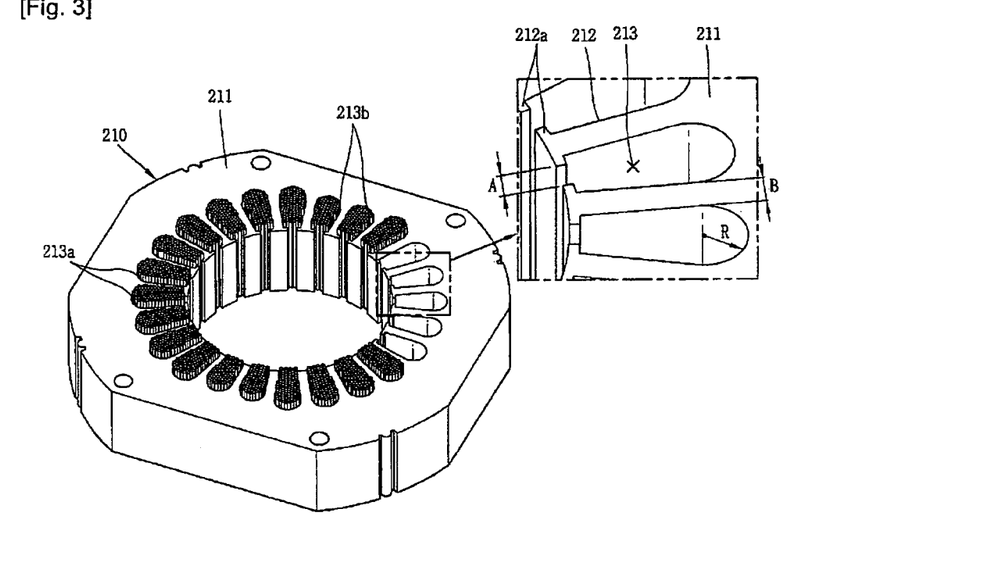
FIG. 3 is a perspective view showing a stator of the motor for the compressor shown in FIG. 1.
Figure 4:
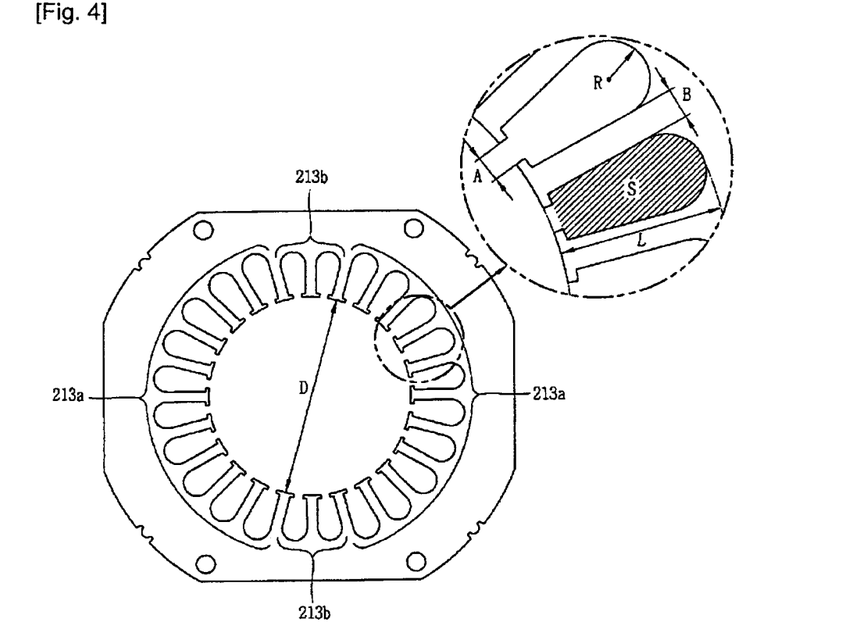
FIG. 4 is a planar view showing the stator of the motor for the compressor shown in FIG. 1.

The stator core, as shown in FIGS. 3 and 4, is provided with a plurality of tooth portions 212 formed at a central side and protruded from an inner circumferential surface of the yoke portion 211 in a radial direction with a certain gap therebetween so as to be wound by a coil. The tooth portions 212 are formed with a uniform gap with a slot portion 213 (to be explained later) interposed therebetween. The tooth portions 212 have approximately the same width B in a lengthwise direction. The width B of each tooth portion 212 is formed approximately not to be longer than a length L in its radial direction, although it depends on the capacity of the motor. Outsides of the tooth portions 212 are curvedly connected with a particular curvature R with neighboring tooth portions 212.

A ratio of the width B of each tooth portion 212 to a curvature R between neighboring tooth portions 212, namely, a ratio of the width B of the tooth portion 212 to the curvature R of the slot portion 213 to be explained later is in relation to the efficiency of the motor for the compressor. That is, the motor 200 for the compressor is configured such that the low ratio B/R of the width B of the tooth portion 212 to the curvature R of the slot portion 213 increases the efficiency of the motor. The ratio B/R is preferably approximately in the range between 1.05 and 1.15.

A ratio D/B of the width B of each tooth portion 212 to the inner diameter D of the stator 210 also relates to efficiency of a motor for a compressor. That is, for the motor 200 for the compressor, preferably, the high ratio of the inner diameter D of the stator 210 to the width B of each tooth portion 212 increases the efficiency of the motor 200, and the ratio D/B is approximately in the range between 13.9 and 15.0.

A pole portion 212a extends from an end of a central side of each tooth portion 212 in a circumferential direction to have a certain gap with neighboring tooth portions 212. The gap A between the pole portion 212a (or an area of an open side of the slot portion) should be formed not to be smaller than at least a diameter d of the coil 240, in order to facilitate a winding work of the coil 240. The gap A between the pole portions 212a (i.e., the inter-pole gap A), which has a great influence on the efficiency of the motor may be differently formed according to a material of the coil 240, the diameter d of the coil 240 and the number of slots of the stator 210. For example, when the coil 240 has a diameter of 0.5 mm, preferably, the inter-pole gap A should be shorter than approximately 1.73 mm for a 20-slot stator (i.e., stator having 20 slots), shorter than approximately 2.10 mm for a 24-slot stator, and shorter than approximately 2.00 mm for a 28-slot stator.

The stator core is provided with slot portions 213 recessed between the tooth portions 212 with an approximately uniform interval so as to configure a space in which the coil 240 is inserted. The slot portions 213 are formed radially long based upon its planar projection. Both side surfaces thereof are formed to be widened from its central side toward its periphery, and its peripheral surface is formed to be curved outwardly.

The slot portions 213, as shown in FIGS. 3 and 4, may include a plurality of main slot portions 213a on which a main coil is wound, and a plurality of sub slot portions 213b on which a sub coil is wound. The main slot portions 213a and the sub slot portions 213b are alternately formed in a circumferential direction with a certain gap therebetween. For example, as shown in FIG. 4, the plurality of main slot portions 213a are formed in the circumferential direction, followed by the plurality of sub slot portions 213b formed with a 90° phase difference. Sequentially, the plurality of main slot portions 213a are formed with a 90° phase difference, followed by the plurality of sub slot portions 213b formed with a 90° phase difference.

A sectional area of each main slot portion 213a may be formed to be larger than that of each sub slot portion 213b. The sectional areas of the main slot portion 213a and the sub slot portion 213b may appropriately be determined depending on the number of turns of the coil with considering productivity of the motor. That is, for the main slot portion 213a, it may be preferable that a ratio N/S1 of the number of turns N to the sectional area S1 of the slot portion 213a is in the range between 2.18 and 2.22. For the sub slot portion 213b, it may be preferable that the ratio N/S2 is in the range between 1.85 and 1.89. Here, the sectional areas of the main and sub slot portions 213a and 213b may be equally applied both to a case where the main and sub slot portions 213a and 213b are all wound by an aluminum coil and to a case where the main slot portions 213a are wound by a copper coil and the sub slot portions 213b are wound by the aluminum coil.

The individual sectional area or entire sectional area and the number of the main slot portions 213a and the sub slot portions 213b can be configured to be the same to or different from each other. They can be designed by considering the efficiency from the perspective of price of a coil wound in the motor. For example, in case of using only the aluminum coil for the coil 240, the individual sectional area or entire sectional area and the number of the main slot portions 213a and the sub slot portions 213b may be extended as compared to the copper coil, but their relative ratio therebetween may be configured not to be very different from the shape of a slot portion of a typical motor. However, in case of using the aluminum coil for the main slot portion 213a and the copper coil for the sub slot portion 213b, the diameter of the aluminum coil is extended more than the diameter of the copper coil, and accordingly the individual sectional area or entire sectional area and the number of the main slot portions 213a may be relatively increased compared to those of the sub slot portions 213b. In contrast, in case of using the copper coil for the main slot portion 213a and the aluminum coil for the sub slot portions 213b, the individual sectional area or entire sectional area and the number of the sub slot portions 213b may be relatively increased compared to those of the main slot portions 213a.

The coil 240 wound on the stator 210 may be made of aluminum (having 62.7% of conductivity), which has the conductivity lower than copper (having 99.9% of conductivity) but not very lower than that, and particularly the price of the aluminum coil 240 is much cheaper than the copper.

The aluminum coil has lower conductivity than the copper, resulting in a chance of lowering the efficiency of the motor 200 for the compressor. Thus, in order to compensate this, preferably, the diameter of the aluminum coil may be about 25% thicker than the diameter of the copper coil.

For the aluminum coil, since the aluminum has lower rigidity than the copper in its material characteristic, in order to maintain the rigidity of the coil, a thickness of an enamel layer coated on an outer circumferential surface of the aluminum coil coated with an insulating material should be thicker than at least an enamel layer coated on the outer circumferential surface of the copper coil.

For the aluminum coil, since the aluminum has lower rigidity than the copper in its material characteristic, a damping effect may be deteriorated. Accordingly, noise may increase at a low frequency band. However, such problem can be solved by optimizing an inner diameter D of the stator 210 and an area S of each slot portion 213 or solved by optimizing the inner diameter D of the stator 210 and a height of a lower end coils 242.

Figure 5:
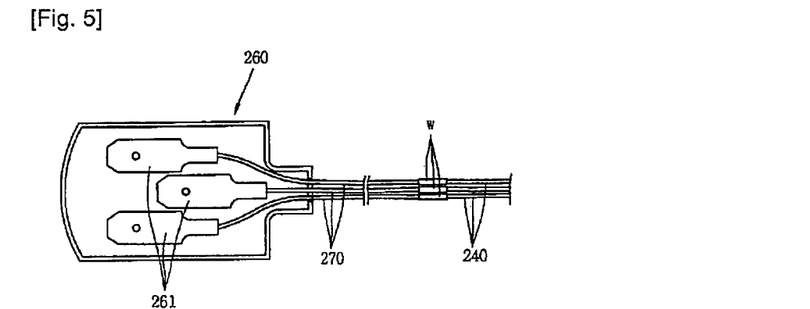
FIG. 5 is a planar view showing a connected state between aluminum coils and lead wires in the motor for the compressor shown in FIG. 1.
Figure 6:
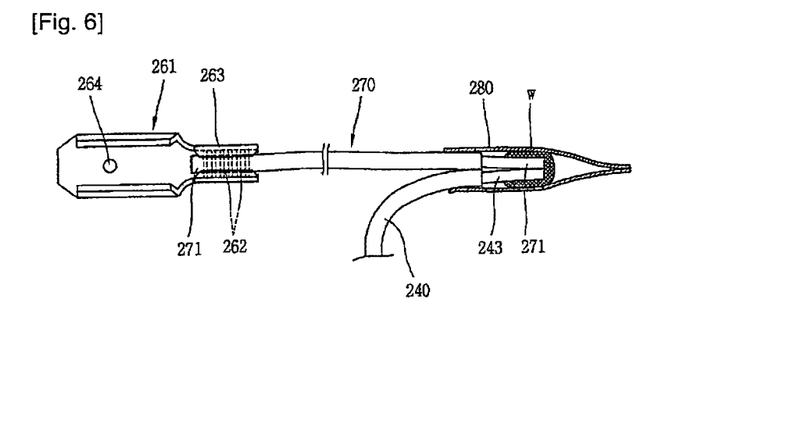
FIG. 6 is an enlarged view showing one embodiment of a method for connecting the aluminum coil and the lead wire to each other shown in FIG. 5.

The terminal 260, as shown in FIGS. 5 and 6, may include bodies 261 implemented as conductors and each having a section in a channel-like shape in which the lead wire 270 is accommodated, respectively, a plurality of exfoliated ribs 262 each implemented by exfoliating the coating of the lead wire 270 accommodated in the corresponding body 261 in a lengthwise direction so as to allow an electrical connection between a copper wire of the lead wire 270 and the corresponding body 260, and a plurality of fixing pieces 263 each plastically deformed along a circumferential direction of the lead wire 270 so as to integrally fix the lead wire 270 to the corresponding body 261.

A power source connecting portion 264 connected to an external power source (not shown) is formed at one side of each body 261 in the lengthwise direction. The plurality of exfoliated ribs 262, which are protruded from a recessed lower portion of each body 261 to extend in a widthwise direction are formed at another side of each body in the lengthwise direction. Here, the plurality of exfoliated ribs 262 are spaced apart from each other in the lengthwise direction. A pair of fixing pieces 263, which are plastically deformed in the circumferential direction of each lead wire 270 for maintaining a connected state between the corresponding lead wire 270 and the copper wire 271, are arranged at both sides of each exfoliated rib 262 in the widthwise direction. Here, various other configurations may be employed for the terminal 260. For example, without the exfoliated ribs 262, the fixing pieces 263 is configured to directly penetrate the coating of each lead wire 270 so as to be electrically conducted directly with the copper wire 271.

Another end of the lead wire 270, namely, another end which is not connected to the terminal 260 is welded to the aluminum coil 240 of the stator 210, namely, to an aluminum wire 243, which is appeared by stripping the coating of the aluminum coil 240 therefrom. To this end, the coating wrapped around the another end of the lead wire 271 is peeled off to expose the copper wire 271. Then, the aluminum wire 243 of the winding coil 240 and the exposed copper wire 271 are twisted together to be provisionally coupled to each other, thereafter being welded W to each other in a manner of supersonic soldering. The welded portion is wrapped by an insulating tub, such as a heat-shrink insulating tub 280, so as to prevent the exposure thereof.

Accordingly, even though a winding coil made of aluminum is wound on the stator of the reciprocating motor, the lead wire, which is connected to the winding coil of the stator to allow the connection between the winding coil and the external power source, is made of copper having stronger tensile force than the aluminum and also the aluminum coil is welded to the lead wire. So, even if the aluminum coil is used as the winding coil of the motor for the compressor, the lead wire is made of copper. Accordingly, when the lead wire is clamped to the terminal, the lead wire can be prevented from being broken or damaged due to the clamping force.

On the other hand, in the previous embodiment, the lead wire 270 is made of copper and then coupled to the winding coil 240 of the stator 210 in the welding manner. However, in this embodiment, the lead wire 270 is made of aluminum and then directly welded to the terminal in the manner of supersonic soldering or the like.

Figure 7:
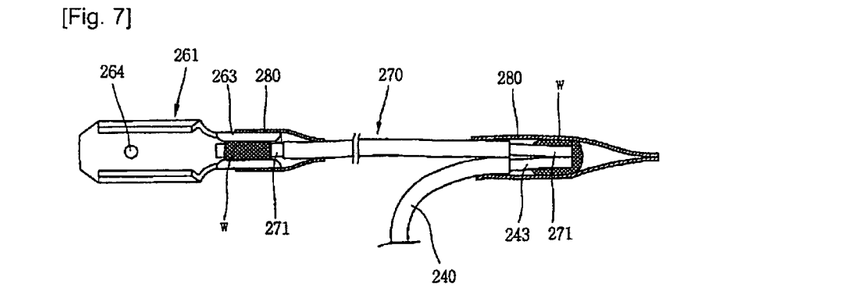
FIG. 7 is an enlarged view showing another embodiment of a method for connecting a lead wire and a terminal to each other shown in FIG. 5.

For example, as shown in FIG. 7, the bodies 261 of the terminal 260 are configured as conductors. The power source connecting portion 264 to which an external power source is connected is formed at one side of each body 261, and the coil connecting portion 265 to which the lead wire 270 is coupled in the welding manner extends from another side of the body 261. In this case, each body 261 is implemented without the exfoliated ribs and the fixing pieces. Alternatively, the fixing pieces 263 are still maintained to enhance the coupled state of the lead wire 270. Thus, the fixing pieces 263 are plastically deformed after welding W the lead wire 270, so as to wrap around the lead wire 270. The welded portion between the corresponding body 261 and the lead wire 270 may be wrapped by an insulating tube, such as a heat-shrink insulating tube 280, thus to be covered with a terminal cover (not shown) or be molded without the use of the insulating tube such as the heat-shrink insulating tube 280, thereby preventing its exposure to the exterior. Similarly, the lead wire 270 and the winding coil 240 of the stator 210 can be bonded to each other or welded in the manner of supersonic soldering or the like.

This embodiment is similar to or the same to the previous embodiment in their configurations and operational effects, and thus a detailed description thereof will not be repeated. However, in case where the lead wire is made of aluminum to be directly welded to the corresponding body 261 of the terminal 260, since the lead wire 270 and the coil 240 of the stator 210 are formed of the same material, a welding operation therefor will be facilitated.

Figure 8:
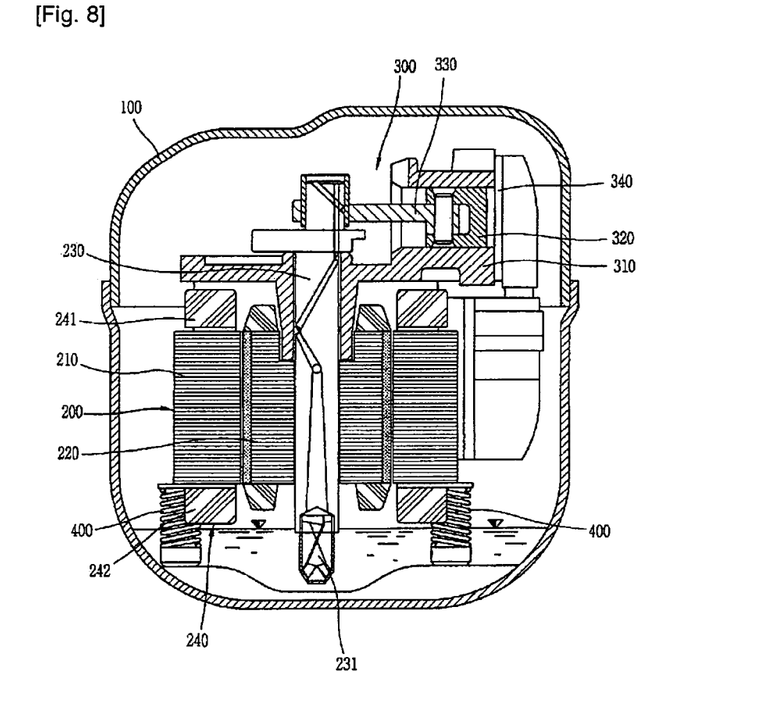
FIG. 8 is a longitudinal cross-sectional view showing a reciprocating compressor having the motor for the compressor shown in FIG. 1.

Hereinafter, a reciprocating compressor having a reciprocating motor according to the above embodiment will be described with reference to FIG. 8.

That is, the reciprocating compressor according to the present invention may include a hermetic case 100, a driving motor 200 serving as a driving source installed in the hermetic case 100, a compression unit 300 configured such that a piston 320 is connected to a rotational shaft 230 of the driving motor 200 via a connecting rod 330 to linearly reciprocate in a compression space of a cylinder block 310 having a valve assembly 340, thus to compress a refrigerant, and a supporting unit 400 installed between a bottom surface of the hermetic case 100 and a lower surface of the driving motor 200 for elastically supporting the driving motor 200 and the compression unit 300.

The driving motor 200 may be implemented as the aforesaid motor for the compressor, namely, an induction motor in which the aluminum coil is inserted in both the main and sub slot portions 213a and 213b of the stator 210 to be wound on the tooth portions 212, or the copper coil is inserted in the main slot portions 213a and the aluminum coil is inserted in the sub slot portions 213b or vice versa so as to be wound on the corresponding tooth portions 212. The driving motor 200 has the same configuration of its stator 210 as described above for the reciprocating motor, detailed description of which will thusly be omitted.

However, in the driving motor 200, when the diameter of the aluminum coil is formed longer than the copper coil in order to maintain the efficiency of the motor, the weight of the stator 210 is increased and also the heights of the upper and lower end coils 241 and 242 of the stator 210 are increased. Accordingly, an installation position of the compression unit 300 and the height of the hermetic case 100 should be raised by considering an interfere with the compression unit 300. It is also required to increase an elastic force in a longitudinal direction of the supporting unit 400 as much as the increased weight of the stator 210. To this end, it may be possible to decrease a height of a compression coil spring configuring the supporting unit 400. However, in this case, it should be considered that an oil feeder installed at a lower end of the rotational shaft 230 of the driving motor 200 should not bump against the hermetic case 100. By concerning the increase in the weight of the stator 100 and the height of the compression unit 300, the weight of an eccentric mass installed at the rotor 220 or the rotational shaft 230 should appropriately be adjusted, in order to prevent noise occurred due to a friction between the stator 210 and the rotor 220 of the driving motor 200.

In the reciprocating compressor according to the embodiment of the present invention, when power is supplied to the driving motor 200, the rotational shaft 230 rotates and the rotational force is converted into a linear reciprocating motion of the compression unit 300 by the connecting rod 330 so as to be transferred. Also, in the compression unit 300, a series of processes are repeated, namely, the piston 320 sucks a refrigerant via the valve assembly 340 while linearly reciprocating in the compression space of the cylinder block 310, so as to compress the refrigerant, and then discharges the compressed refrigerant to a refrigerating system.

Here, in the driving motor 200, when an alternating current is applied from the exterior to a main coil and a sub coil wound on the stator 210, a force is applied that the sub coil, which has a pole axis electrically prior to the main coil by 90°, is primarily rotated due to the formation of a rotation magnetic field by the current. Also, the sub coil has a current phase which is prior to the main coil due to a capacitor serially connected thereto. Accordingly, the driving motor 200 rotates at high speed. While the driving motor 200 rotates at the high speed, the rotational force is converted into a linear motion via the connecting rod 330, to be transferred to the piston 320.

As such, by employing the driving motor with the aluminum coil wound therein, a material cost of the driving motor can be reduced so as to drastically decrease a fabricating cost without a great change in the efficiency of the reciprocating compressor as compared to a motor having the copper coil wound therein. Also, the efficiency of the reciprocating compressor can be improved from the perspective of its price by appropriately designing an individual sectional area, an entire sectional area or the number of main and sub slot portions. In addition, the lead wire for connecting the driving motor to an external power source is welded to the aluminum coil of the driving motor. Accordingly, the breaking of the aluminum coil, which may occur when coupling the aluminum coil to the lead wire, can be prevented, resulting in improvement of assembly reliability of the reciprocating compressor.

The motor for the compressor according to the present invention can be applied to other compressors as well as the reciprocating compressor. However, standards for each component may be different for each compressor.

[Pretext]

Motor for compressor, stator, aluminum coil, terminal

The invention claimed is:

1. A motor for a compressor, comprising:
a stator including a yoke portion formed in an annular shape to configure a passage through which magnetism flows, a plurality of tooth portions that protrudes from an inner circumferential surface of the yoke portion toward a center thereof by a predetermined length in a circumferential direction, and a plurality of slot portions recessed between the plurality of tooth portions by a predetermined sectional area in a circumferential direction;
a plurality of coils wound on the plurality of slot portions and the plurality of tooth portions of the stator, at least some of the plurality of coils being formed of aluminum;
a rotor inserted in the stator with a predetermined gap therebetween and having a plurality of first conductors therein, which is rotated by an electromagnetic induction of the plurality of coils;
a rotational shaft press-fitted in a center of the rotor that transfers a rotational force to a compression device; and
a terminal having a plurality of lead wires coupled to the plurality of coils in a welding manner to connect the plurality of coils to an external power source, wherein each of the plurality of coils and the plurality of lead wires has a peeled end that is coupled to each other in a welding manner, and wherein the welded portion between the plurality of coils and the plurality of lead wires are wrapped by an insulating tube.

2. The motor of claim 1, wherein the plurality of coils and the plurality of lead wires are coupled to each other by supersonic soldering.

3. The motor of claim 1, wherein each of the plurality of lead wires is made of copper.

4. The motor of claim 3, wherein the plurality of lead wires is clamped to the terminal, which has a plurality of plastically deformed fixing pieces.

5. The motor of claim 1, wherein the terminal includes a plurality of second conductors each allowing a connection between the terminal and the plurality of lead wires, which is connected to the plurality of coils such that the plurality of coils is connected to the external power source, and wherein each of the plurality of lead wires is made of aluminum to be coupled to each conductor of the plurality of coils in the welding manner.

6. The motor of claim 5, wherein the welded portions between the plurality of lead wires and each conductor of the plurality of coils is wrapped by an insulating tube or molded.

7. The motor of claim 5, wherein at least a portion of the plurality of coils wound at the stator is made of aluminum.

8. The motor of claim 1, wherein a width of the plurality of tooth portions is not smaller than at least a diameter of the plurality of coils.

9. The motor of claim 1, wherein an outer end of the plurality of tooth portions is connected to a plurality of neighboring tooth portions with a curved surface having a curvature which is not smaller than at least a curvature of the plurality of coils.

10. The motor of claim 1, wherein the plurality of slot portions includes a plurality of main slot portions wound by a main coil and a plurality of sub slot portions wound by a sub coil, wherein the plurality of main slot portions and the plurality of sub slot portions have different sectional areas, and wherein a plurality of the plurality of main slot portions and the plurality of sub slot portions are alternately arranged.

11. The motor of claim 10, wherein the main and sub coils wound at the respective plurality of main slot portions and the plurality of sub slot portions are all aluminum coil.

12. The motor of claim 10, wherein at least one of the main and sub coils wound at the respective plurality of main slot portions and the plurality of sub slot portions is an aluminum coil, and the other is a coil having a higher conductivity than a conductivity of the aluminum coil.

13. The motor of claim 1, wherein the plurality of slot portions includes a plurality of main slot portions wound by a main coil and a plurality of sub slot portions wound by a sub coil, wherein the plurality of main slot portions and the plurality of sub slot portions have the same sectional area, and wherein a plurality of the plurality of main slot portions and the plurality of sub slot portions are alternately arranged.

14. The motor of claim 13, wherein the main and sub coils wound at the respective plurality of main slot portions and the plurality of sub slot portions are all aluminum coil.

15. The motor of claim 13, wherein at least one of the main and sub coils wound at the respective plurality of main slot portions and the plurality of sub slot portions is an aluminum coil, and the other is a coil having a higher conductivity than a conductivity of the aluminum coil.

\* \* \* \* \*